United States Patent
Yoneyama

Patent Number: 6,002,533
Date of Patent: Dec. 14, 1999

[54] CLOSE-UP ATTACHMENT LENS

[75] Inventor: Shuji Yoneyama, Saitama, Japan

[73] Assignee: Asahi Kogaku Kogyo Kabushiki Kaisha, Tokyo, Japan

[21] Appl. No.: 09/121,986

[22] Filed: Jul. 28, 1998

[30] Foreign Application Priority Data

Mar. 17, 1997 [JP] Japan ..................... 9-219893

[51] Int. Cl.⁶ ................................ G20B 9/14
[52] U.S. Cl. .................... 359/785; 359/784; 359/672; 359/673
[58] Field of Search .................. 359/784, 785, 359/672, 673; 396/16, 71

[56] References Cited

U.S. PATENT DOCUMENTS 5,216,546  6/1993  Hasushita .................... 359/673

FOREIGN PATENT DOCUMENTS 53-16628  2/1978  Japan.
3-39917   2/1991  Japan.
5-2247121 9/1993  Japan.

OTHER PUBLICATIONS

English Language Abstarct of JP–5–224121, Sep. 3, 1993.
English Language Abstract of JP–53–16628, Feb. 15, 1978.
D. Laney, entitled "Leica Lens Practice: Choosing and Using Leica Lenses", Hove Books, pp. 146–147, Jul. 1993.

Primary Examiner—Georgia Epps
Assistant Examiner—David N. Spector
Attorney, Agent, or Firm—Greenblum & Bernstein, P.L.C.

[57] ABSTRACT

A close-up attachment lens, for enabling close-up photograph along with a main lens, is arranged to be attached to the object side of said main lens. The close-up attachment lens comprises, in that order from the object side, a positive first lens element, a negative second lens element, and a positive third lens element formed as a meniscus lens that is convex on the image side. Furthermore, the close-up attachment lens satisfies the following conditions:

$$0.005 < d2/fA < 0.040 \quad (1)$$
$$0.010 < (d2+d4)/fA < 0.060 \quad (2)$$

wherein:
di designates the distance between the ith surface and $(i+1)^{th}$ surface;
fA designates the focal length of the attachment lens.

4 Claims, 6 Drawing Sheets

SPHERICAL ABERRATION
THE SINE CONDITION

SPHERICAL ABERRATION
CHROMATIC ABERRATION

LATERAL CHROMATIC ABERRATION

ASTIGMATISM

DISTORTION

CLOSE-UP ATTACHMENT LENS

BACKGROUND OF THE INVENTION

1. Field of the Invention

The present invention relates to a close-up attachment lens to be attached to a photographic lens (main lens) of a camera on the object side, enabling close-up photography of a magnification from −0.5 to −1.0.

2. Description of the Related Art

Close-up attachment lenses, for example, which are disclosed in the laid-open Japanese Patent Publications (No.3-39917 and No.5-224121) have been known. In addition, the U.S. patent application Ser. No. (505,640), which was based on one of the Publications, JP3-39917, has been patented as the U.S. Pat. No. 5,216,546 (Jun. 1, 1993). Both of these laid-open patent publications and the U.S. patent have disclosed a three-lens-element arrangement, having two positive lens elements and one negative lens element.

However, as the magnification of the lens taught in the above laid-open Japanese Patent Publication No.3-39917 is −1.1 to −2.1, which is relatively high, the correction of spherical aberration and lateral chromatic aberration cannot sufficiently be made. On the other hand, the magnification of the lens taught in the above laid-open Japanese Patent Publication No.5-224121 is −0.9 to −0.80. This means that the magnification does not reach −1.0 (the life size), and is not suitable for the purposes of the close-up attachment lens of the present invention which has a magnification of −0.5 to −1.0. Furthermore, with the lens arrangement of JP5-224121, it should be noted that astigmatism and distortion are relatively large.

Generally, in order to satisfactorily correct aberrations, making the power of each lens weaker can be effective. However, if the power of the lenses are made too weak, the entire length the lens system becomes longer as well as the diameter of the lens on the object side increasing. Usually, in a main lens of a camera, there is a fixing member having thread groves for detachably attaching a filter or other accessories to the frontmost inner peripheral wall of the lens barrel of the main lens. However, if the lens diameter on the object side of the attachment lens is made larger, the internal diameter of an installing portion of the attachment lens inevitably becomes larger than the internal diameter of the fixing member of the main lens. Consequently, various sizes of accessories have to be prepared depending on the diameter on the object side of the attachment lens and that of the main lens.

SUMMARY OF THE INVENTION

The object of the present invention, taking the above described disadvantages of the prior art into consideration, is to provide a close-up attachment lens wherein the lens diameter on the object side is not made larger, and wherein various aberrations can be satisfactorily corrected at a magnification range of −0.5 to −1.0.

To achieve the above mentioned object there is provided a close-up attachment lens, for enabling close-up photography along with a main lens, is arranged to be attached to the object side of said main lens. The close-up attachment lens comprises, in that order from the object side, a positive first lens element, a negative second lens element, and a positive third lens element formed as a meniscus lens that is convex on the image side. Furthermore, the close-up attachment lens satisfies the following conditions:

$$0.005 < d2/fA < 0.040 \quad (1)$$

$$0.010 < (d2+d4)/fA < 0.060 \quad (2)$$

wherein:

di designates the distance between the $i^{th}$ surface and $(i+1)^{th}$ optical surfaces along the axis of the close-up attachment lens LA;

fA designates the focal length of the close-up attachment lens.

Furthermore, the close-up attachment lens according to the present invention preferably satisfies the following condition:

$$0.400 < (r1+r2)/(r2-r1) < 1.000 \quad (3)$$

wherein ri designates the radius of curvature of the ith optical surface along the optical axis of the close-up attachment lens LA.

Still further, the close-up attachment lens according to the present invention preferably satisfies the following condition:

$$0.300 < (r3+r4)/(r4-r3) < 0.700 \quad (4)$$

wherein ri designates the radius of curvature of the ith lens.

Moreover, the close-up attachment lens according to the present invention preferably satisfies the following condition:

$$1.70 < n1 \quad (5)$$

wherein n1 designates the refractive index the first lens.

The present disclosure relates to subject matter contained in Japanese Patent Application No.9-219893 (filed on Jul. 31, 1997) which is expressly incorporated herein by reference in its entirety.

BRIEF DESCRIPTION OF THE DRAWINGS

The invention will be discussed below in detail with reference to the accompanying drawings, in which.

DESCRIPTION OF THE PREFERRED EMBODIMENTS

The embodiments of the present invention will be discussed below. A close-up attachment lens LA is attached to the object side of the main lens LM, and is used for close-up photography. The close-up attachment lens LA is a triplet lens which is composed of, in order from the object side, a first positive lens L1, a second negative lens L2, and a third lens L3 which is a positive meniscus lens and convex on the image side. It should be noted that the close-up attachment lens LA by itself is designed to correct various aberrations. On the other hand, the main lens LM is designed to correct various aberrations by itself as well. The close-up attachment lens LA is designed to be attached to the below-explained main lens LM.

The main lens LM is composed of the six lens elements. These six lens elements are divided into the two lens groups. The front lens group contains the first to third lenses LM1 to LM3, whereas the rear lens group contains the fourth to sixth lenses LM4 to LM6. Accordingly, each lens group has three lens elements.

The close-up attachment lens LA satisfies the following five conditions:

$$0.005 < d2/fA < 0.040 \quad (1)$$

$$0.010 < (d2+d4)/fA < 0.060 \quad (2)$$

wherein:

di designates the distance between the $i^{th}$ surface and (i+1)th optical surfaces along the axis of the close-up attachment lens LA;

fA designates the focal length of the attachment lens.

Moreover, the close-up attachment lens LA satisfies the following condition:

$$0.400 < (r1+r2)/(r2-r1) < 1.000 \quad (3)$$

wherein ri designates the radius of curvature of the ith lens.

The close-up attachment lens LA further satisfies the following condition:

$$0.300 < (r3+r4)/(r4-r3) < 0.700 \quad (4)$$

wherein ri designates the radius of curvature of the ith optical surface along the optical axis of the close-up attachment lens LA.

Still further, the close-up attachment lens LA satisfies the following condition:

$$1.70 < n1 \quad (5);$$

wherein n1 designates the refractive index the first lens.

Condition (1) determines the distance between the first lens L1 and the second lens L2 of the attachment lens. When the first lens L1 is formed so that condition (1) is satisfied, aberration can be curbed and an over sized diameter of the first lens L1 can be avoided. If d2/fA exceeds the lower limit, the distance between the lenses becomes too short, the power of the first lens L1 becomes too strong, so that correction of spherical aberration and chromatic aberration on each lens becomes difficult. On the other hand, if d2/fA exceeds the upper limit, the lens diameter of the first lens L1 has to be made larger in order to maintain the angle of view of the main lens.

Condition (2) determines the sum of the lens thickness or distance of three lens elements of the attachment lens. If the lenses are formed so that this condition is satisfied, aberration from each lens is curbed, and the entire lens body can be avoided to be bulky. If (d2+d4)/fA exceeds the lower limit, the power of each lens element becomes too strong, and correction of spherical aberration and the like becomes dificult. Moreover, since the Petzval sum becomes larger, correction of field curvature becomes difficult as well. If (d2+d4)/fA exceeds the upper limit, in order to maintain the angle of view, the lens diameter of the first lens L1 increases, and furthermore, the size of the entire lens body is increased.

Condition (3) determines the shape of the first lens L1. If the first lens L1 is formed so that condition (3) is satisfied, field curvature and distortion can be maintained at a minimum. If (r1+r2)/(r2−r1) exceeds the lower limit, under field curvature is generated and distortion increases in the positive direction. If (r1+r2)/(r2−r1) exceeds the upper limit, over field curvature is generated. It should be understood that the above under field curvature means a state where an off-axis imaging point is formed before the paraxial imaging point along the light progressing path (negative direction), and the above over field curvature means a state where an off-axis imaging point is formed behind the paraxial imaging point along the light progressing path (positive direction).

Condition (4) determines the shape of the second lens L2. If the second lens L2 is formed so that condition (4) is satisfied, spherical aberration, field curvature and distortion can be maintained at a minimum. If (r3+r4)/(r4−r3) exceeds the lower limit, under field curvature is generated and distortion increases in the positive direction. If (r3+r4)/(r4−r3) exceeds the upper limit, the curvature of the surface on the object side of the second lens L2 becomes larger, over spherical aberration is generated, comatic aberration increases, and over field curvature is generated.

Condition (5) determines the refractive index of the first lens L1. If the first lens L1 is formed by utilizing a glass material having a high refractive index so that condition (5) is satisfied, the Petzval sum for the attachment lens LA can be curbed, and aberrations can be corrected by the attachment lens LA by itself. If n1 exceeds the lower limit, the Petzval sum becomes too large, and correction of field curvature becomes difficult.

Next, specific examples with data will be explained for three embodiments of the present invention as described above.

Embodiment 1

Figure 1:
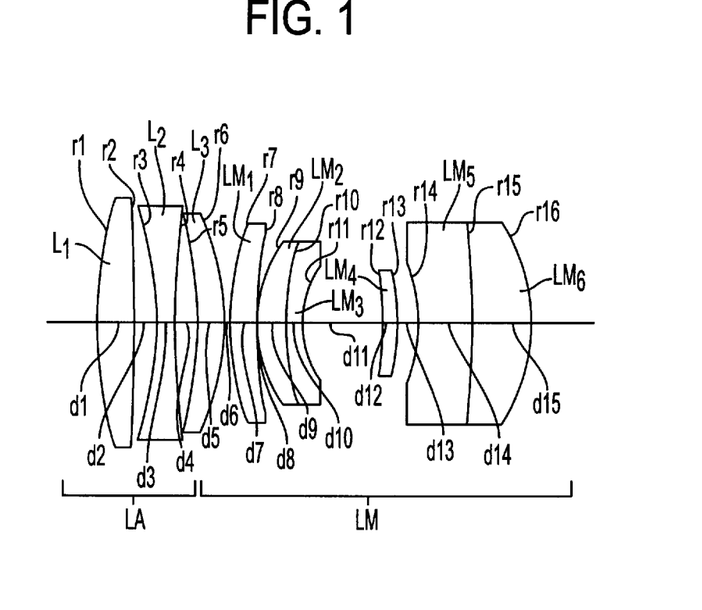
FIG. 1 is a lens arrangement showing the close-up attachment lens of the first embodiment with the main lens attached, wherein the main lens is focused on an object at infinity.

FIG. 1 shows the close-up attachment lens LA of the first embodiment with the main lens LM attached, wherein the main lens LM is focused on an object at infinity. FIGS. 2A, 2B, 2C, 2D and 2E are aberration diagrams of the lens system of FIG. 1. FIG. 3 shows the close-up attachment lens with the main lens attached, wherein the main lens is focused on an object at the shortest possible in-focus distance. FIGS. 4A, 4B, 4C, 4D and 4E show aberration diagrams of the entire lens system in FIG. 3.

Figure 2A:
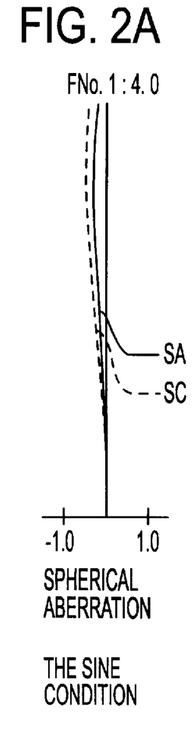
FIGS. 2A, 2B, 2C, 2D, and 2E show aberration diagrams of the entire lens system in FIG. 1.
Figure 2B:
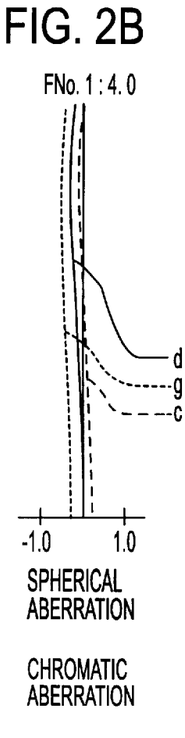
Figure 2C:
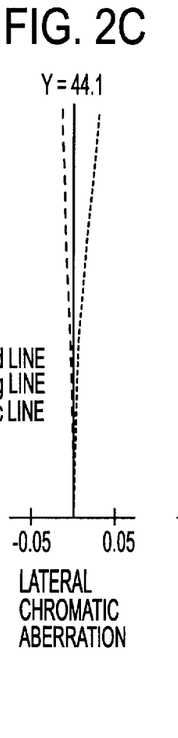
Figure 2D:
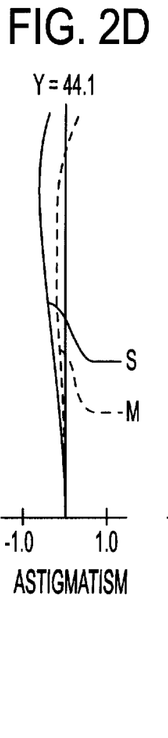
Figure 2E:
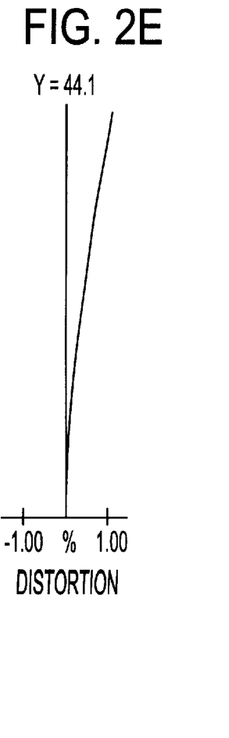
Figure 3:
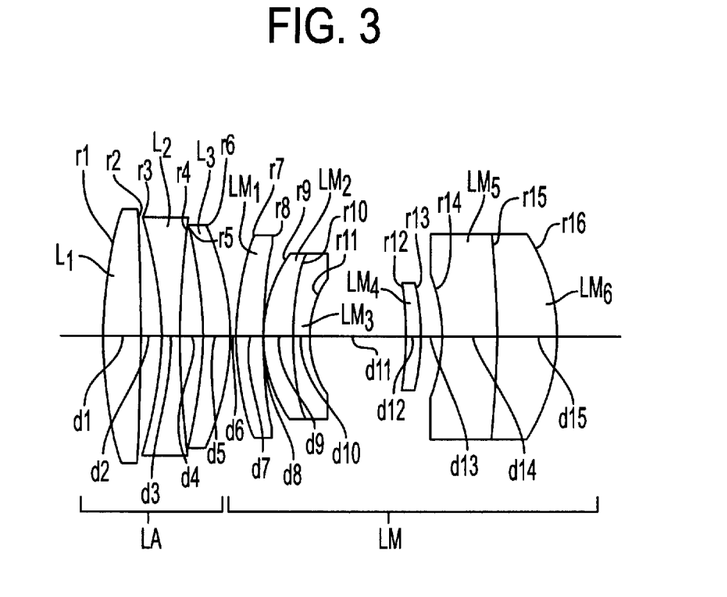
FIG. 3 is a lens arrangement showing the close-up attachment lens of the first embodiment with the main lens attached, wherein the main lens is focused on an object at the shortest possible in-focus distance.
Figure 4A:
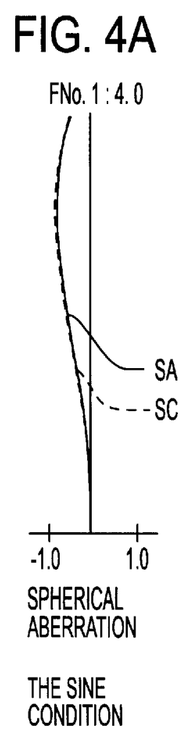
FIGS. 4A, 4B, 4C, 4D and 4E show aberration diagrams of the entire lens system in FIG. 3.
Figures 4B, 4C:
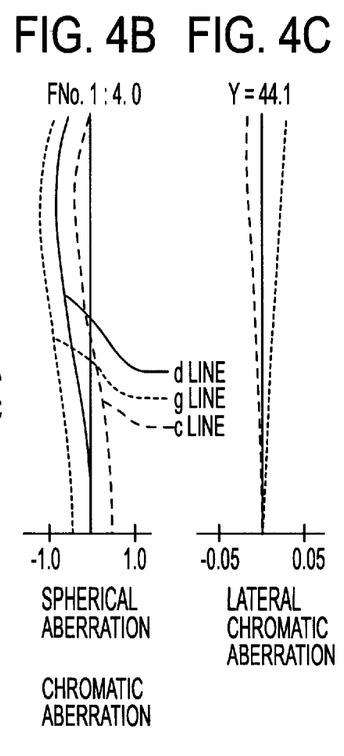
Figure 4D:
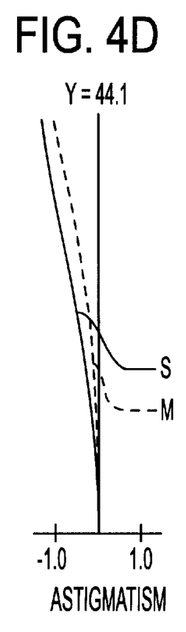
Figure 4E:
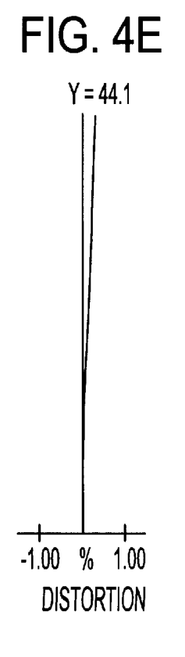

FIGS. 2A and 4A show the spherical aberration SA and the sine condition SC of the d-line. FIGS. 2B and 4B show chromatic aberration represented by spherical aberration at the respective wave length of the d-line (wavelength 588 nm), g-line (wave-length 436 nm) and c-line (wave-length 656 nm). FIGS. 2C and 4C show lateral chromatic aberration of the g-line and the c-line with respect to the d-line as a reference wave-length. FIGS. 2D and 4D show astigmatism (S designates the sagittal image; M designates the meridional image). FIGS. 2E and 4E show distortion. The unit of distortion, which is shown along the abscissa (horizontal axis), is a percentage, and the unit of other aberrations, which is shown along the abscissa (horizontal axes), is millimeters. F represents the F-number and Y represents the optical image height.

Specific numerical data of the entire lens system of the first embodiment is shown in Table 1. In Table 1, F NO. designates the F-number of the entire lens system, M designates the magnification of the entire lens system, fA designates the focal-length of the attachment lens (mm), r designates the radius of curvature of each lens surface (mm), d designates the lens thickness or lens distance (mm), nd designates the refractive index of the d-line (wave length 588 nm) of each lens, and vd is the Abbe number of each lens. The surface numbers No.1 to No.6 are the attachment lens LA, the surface numbers No.7 to No.16 are the main lens LM. Furthermore, with respect to values which are variable due to focusing, the lower limit (the value to the left of the '~' symbol) indicates the value when focusing is carried out on an object at infinity, and the upper limit (the value to the right of the '~' symbol) indicates the value when focusing is carried out at the shortest possible in-focus distance. Moreover, although omitted from the diagrams, there is a diaphragm provided between the 11th and 12th surfaces. The distance between the diaphragm and the 12th surface is set to 4.00 mm.

TABLE 1

FNO. = 1:4.0 to 1:6.0, fA = 219.711 mm, M = −0.455 to −1.087

| Surface No. | r | d | nd | vd |
|---|---|---|---|---|
| 1 | 77.648 | 6.00 | 1.77250 | 49.6 |
| 2 | −501.613 | 3.54 | — | — |
| 3 | −66.781 | 2.80 | 1.64769 | 33.8 |
| 4 | 140.996 | 3.74 | — | — |
| 5 | −76.712 | 4.40 | 1.83400 | 37.2 |
| 6 | −48.596 | 1.00 | — | — |
| 7 | 46.500 | 4.40 | 1.72000 | 43.7 |
| 8 | 95.900 | 0.20 | — | — |
| 9 | 25.064 | 4.80 | 1.67790 | 55.3 |
| 10 | 48.800 | 2.80 | 1.62004 | 36.3 |
| 11 | 17.750 | 13.30~15.58 | — | — |
| 12 | −83.484 | 2.50 | 1.74400 | 44.8 |
| 13 | −43.469 | 3.45 | — | — |
| 14 | −28.598 | 9.00 | 1.74077 | 27.8 |
| 15 | −168.970 | 10.00 | 1.72000 | 43.7 |
| 16 | −33.124 | — | — | — |

Embodiment 2

Figure 5:
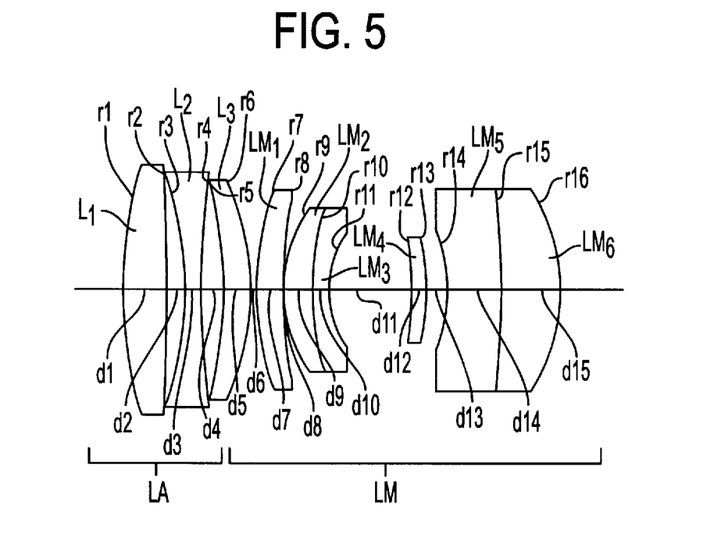
FIG. 5 is a lens arrangement showing the close-up attachment lens of the second embodiment with the main lens attached, wherein the main lens is focused on an object at infinity.
Figure 6A:
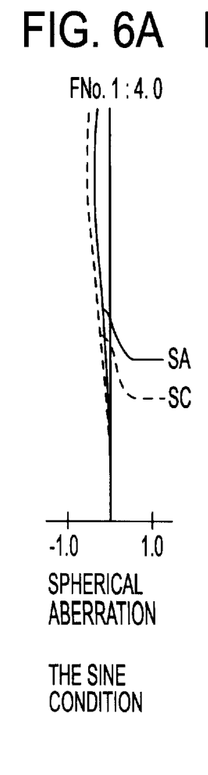
FIGS. 6A, 6B, 6C, 6D and 6E show aberration diagrams of the entire lens system in FIG. 5.
Figures 6B, 6C:
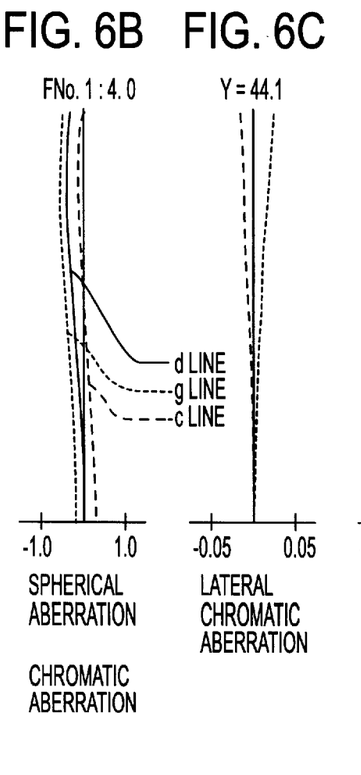
Figures 6D, 6E:
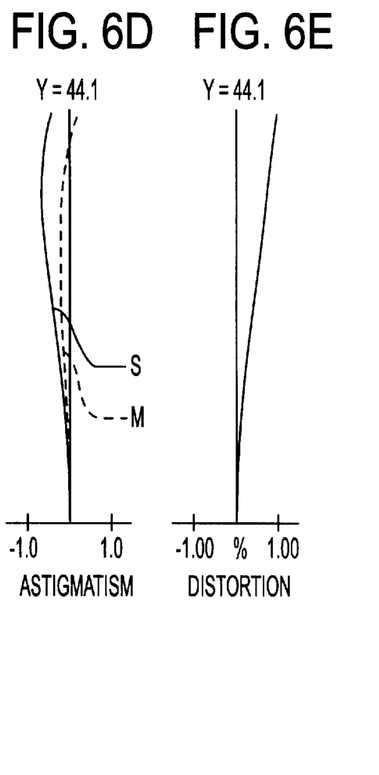
Figure 7:
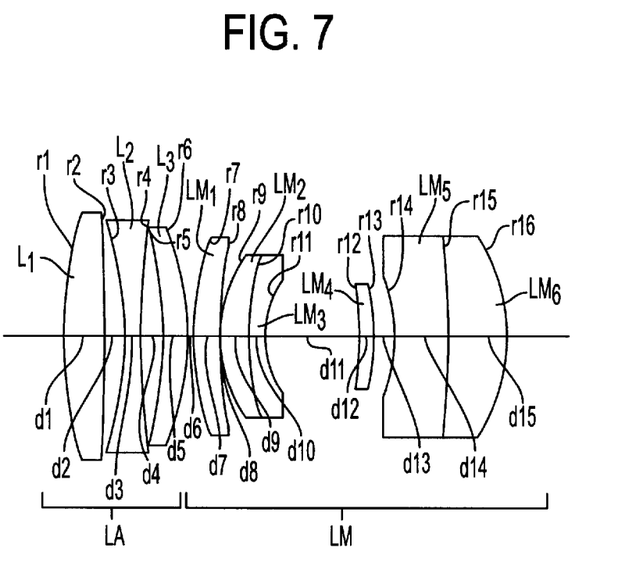
FIG. 7 is a lens arrangement showing the close-up attachment lens of the second embodiment with the main lens attached, wherein the main lens is focused on an object at the shortest possible in-focus distance.
Figure 8A:
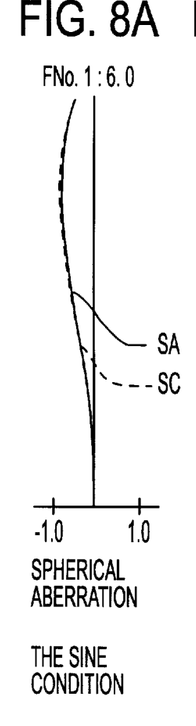
FIGS. 8A, 8B, 8C, 8D and 8E show aberration diagrams of the entire lens system in FIG. 7.
Figures 8B, 8C:
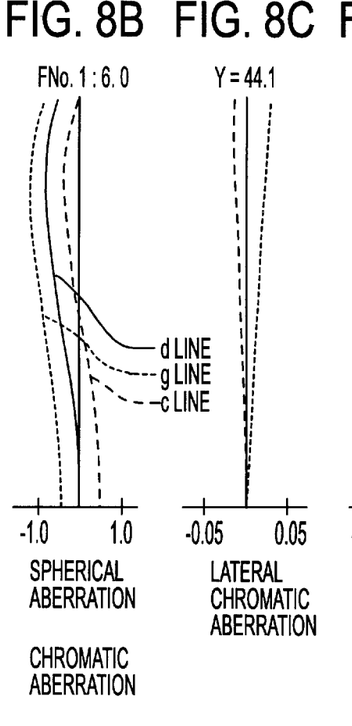
Figure 8D:
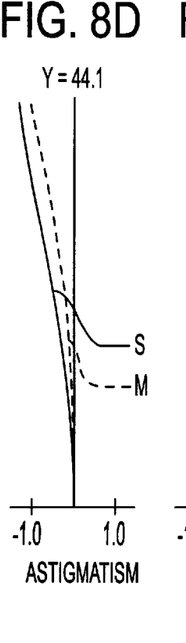
Figure 8E:
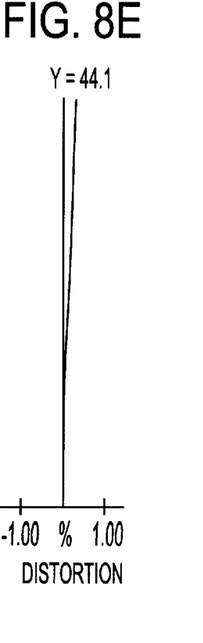

FIG. 5 is a lens arrangement showing the close-up attachment lens LA of the second embodiment with the main lens LM attached, wherein the main lens LM is focused on an object at infinity. FIGS. 6A, 6B, 6C, 6D and 6E show aberration diagrams of the entire lens system in FIG. 5. FIG. 7 is a lens arrangement showing the close-up attachment lens LA of the second embodiment with the main lens LM attached, wherein the main lens LM is focused on an object at the shortest possible in-focus distance. FIGS. 8A, 8B, 8C, 8D and 8E show aberration diagrams of the entire lens system in FIG. 7.

Specific numerical data of the attachment lens LA of the second embodiment is shown in Table 2. Note that the lens arrangement of the main lens LM of this embodiment is the same as that of the first embodiment. Therefore the surface numbers 7 through 16 of Table 1 are not shown. Only the lens surfaces of the attachment lens LA (surface No.1 through NO. 6) are shown.

TABLE 2

FNO. = 1:4.0 to 1:6.0, fA = 220.151 mm, M = −0.454 to −1.085

| Surface No. | r | d | nd | vd |
|---|---|---|---|---|
| 1 | 77.910 | 6.95 | 1.77250 | 49.6 |
| 2 | −500.000 | 3.10 | — | — |
| 3 | −67.434 | 2.70 | 1.64769 | 33.8 |
| 4 | 141.696 | 3.71 | — | — |
| 5 | −77.134 | 4.41 | 1.83400 | 37.2 |
| 6 | −48.983 | 1.00 | — | — |

Embodiment 3

Figure 9:
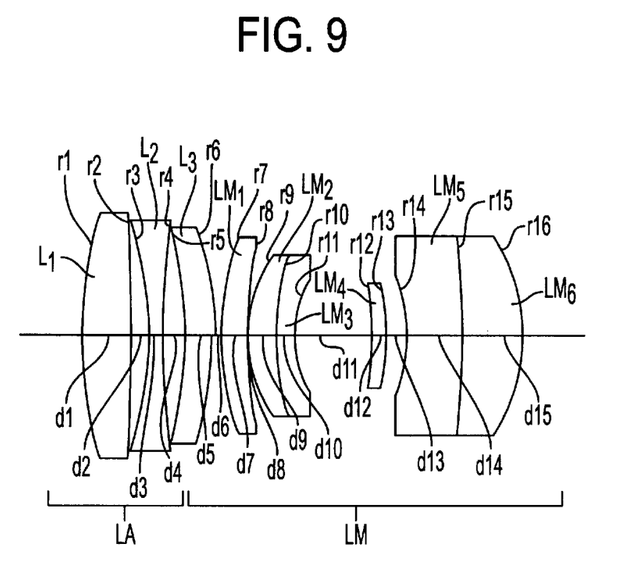
FIG. 9 is a lens arrangement showing the close-up attachment lens of the third embodiment with the main lens attached, wherein the main lens is focused on an object at infinity.
Figure 10A:
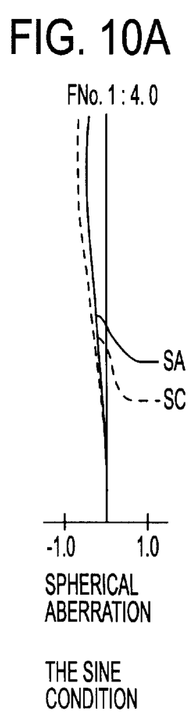
FIGS. 10A, 10B, 10C, 10D and 10E show aberration diagrams of the entire lens system in FIG. 9.
Figures 10B, 10C:
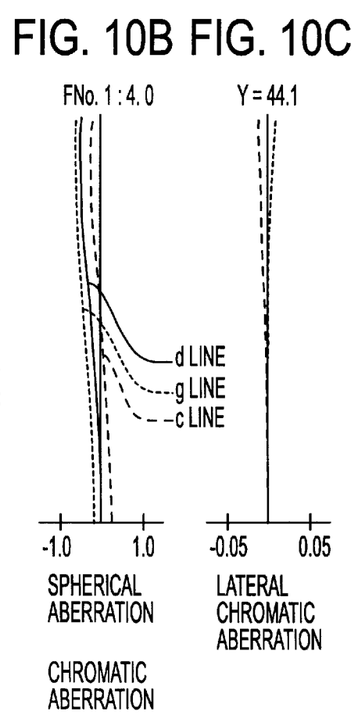
Figure 10D:
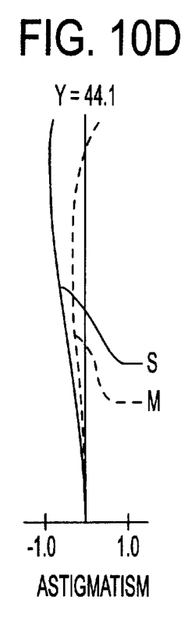
Figure 10E:
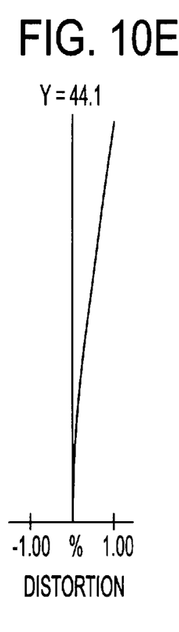
Figure 11:
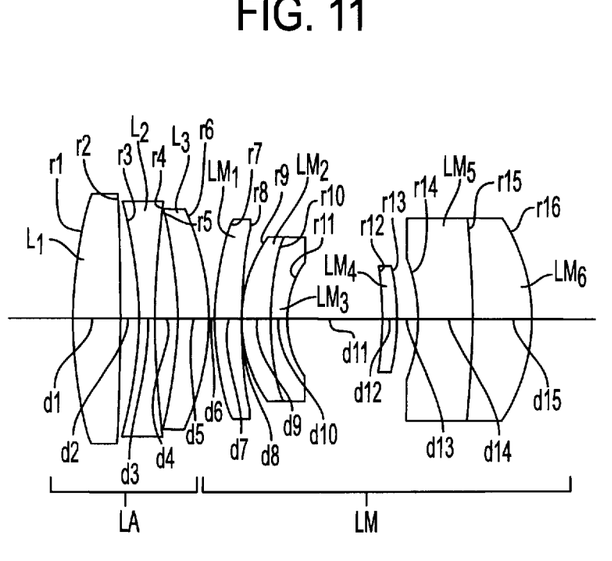
FIG. 11 is a lens arrangement showing the close-up attachment lens of the third embodiment with the main lens attached, wherein the main lens is focused on an object at the shortest possible in-focus distance.
Figure 12A:
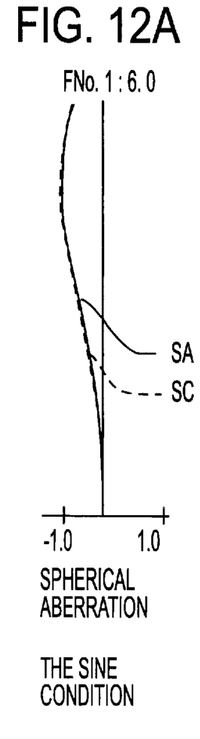
FIGS. 12A, 12B, 12C, 12D and 12E show aberration diagrams of the entire lens system in FIG. 11.
Figure 12B:
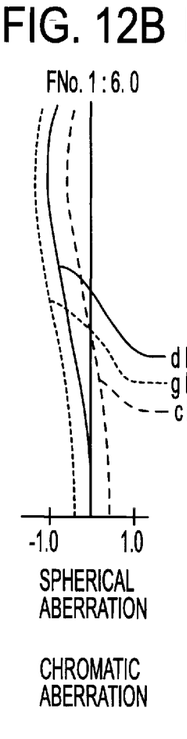
Figure 12C:
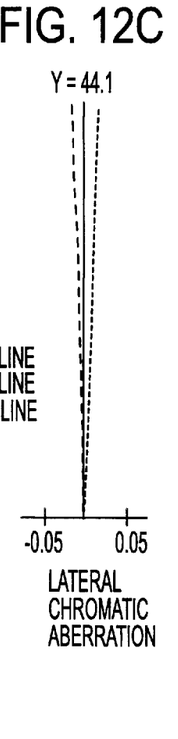
Figure 12D:
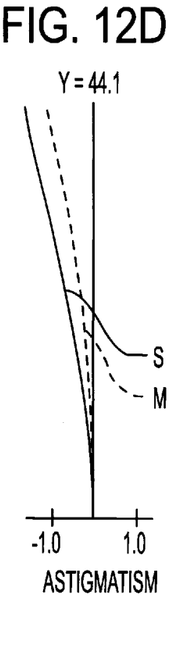
Figure 12E:
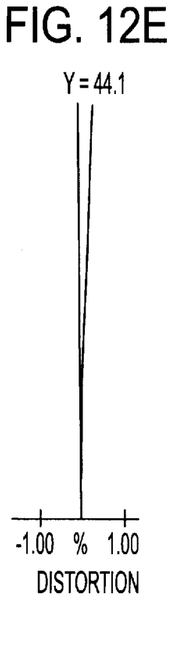

FIG. 9 is a lens arrangement showing the close-up attachment lens LA of the third embodiment with the main lens LM attached, wherein the main lens LM is focused on an object at infinity. FIGS. 10A, 10B, 10C, 10D and 10E show aberration diagrams of the entire lens system in FIG. 9. FIG. 11 is a lens arrangement showing the close-up attachment lens LA of the third embodiment with the main lens LM attached, wherein the main lens LM is focused on an object at the shortest possible in-focus distance. FIGS. 12A, 12B, 12C, 12D and 12E show aberration diagrams of the entire lens system in FIG. 11.

Specific numerical data of the attachment lens LA of the third embodiment is shown in Table 3. Note that the lens arrangement of the main lens LM of this embodiment is the same as that of the first embodiment. Therefore the surface numbers 7 through 16 of table 1 are not shown. Only the lens surfaces of the attachment lens LA (surface No. 1 through No. 6) is shown. It should also be noted that in this third embodiment, the value of d11 corresponding to the shortest possible in-focus distance is set at 15.60 mm, and only this value differs from the first and second embodiments.

TABLE 3

FNO. = 1:4.0 to 1:6.0, fA = 218.788 mm, M = −0.457 to −1.092

| Surface No. | r | d | nd | vd |
|---|---|---|---|---|
| 1 | 81.400 | 8.24 | 1.71299 | 53.9 |
| 2 | −462.000 | 2.98 | — | — |
| 3 | −67.270 | 2.70 | 1.64769 | 33.8 |
| 4 | 193.440 | 3.16 | — | — |
| 5 | −87.610 | 5.50 | 1.83400 | 37.2 |
| 6 | −52.754 | 1.00 | — | — |

Table 4 below shows values of conditions (1) to (5) for each embodiment. Each embodiment satisfies every condition, and satisfactory optical performance is attained.

TABLE 4

| Condition | Range | Embodiment (1) | Embodiment (2) | Embodiment (3) |
|---|---|---|---|---|
| (1) | 0.005–0.040 | 0.016 | 0.014 | 0.014 |
| (2) | 0.010–0.060 | 0.033 | 0.031 | 0.028 |
| (3) | 0.400–1.000 | 0.732 | 0.730 | 0.700 |
| (4) | 0.300–0.700 | 0.357 | 0.355 | 0.484 |
| (5) | 1.70– | 1.77 | 1.77 | 1.71 |

As can be understood from the above discussion, according to the present invention, a triplet close-up attachment lens, in which aberrations can be corrected at a magnification range of −0.5 to −1.0, can be provided without increasing the lens diameter on the object side.

What is claimed is:

1. A close-up attachment lens, for enabling close-up photography along with a main lens, is arranged to be attached to the object side of said main lens, said close-up attachment lens comprising, in that order from the object side, a positive first lens element, a negative second lens element, and a positive third lens element formed as a meniscus lens that is convex on the image side, wherein said close-up attachment lens satisfies the following conditions:

$0.005 < d2/fA < 0.040$ $0.010 < (d2+d4)/fA < 0.060$ wherein:

di designates the distance between an $i^{th}$ surface and $(I+1)^{th}$ optical surfaces along the axis of the close-up attachment lens;

fA designates the focal length of the attachment lens.

2. The close-up attachment lens according to claim 1, wherein said close-up attachment lens further satisfies the following condition:

$0.400 < (r1+r2)/(r2-r1) < 1.000$ wherein ri designates the radius of curvature of the ith optical surface along the optical axis of the close-up attachment lens.

3. The close-up attachment lens according to claims 1 and 2, wherein said close-up attachment lens further satisfies the following condition:

$0.300 < (r3+r4)/(r4-r3) < 0.700$ wherein ri designates the radius of curvature of the ith optical surface along the optical axis of the close-up attachment lens.

4. The close-up attachment lens according to claim 1, wherein said close-up attachment lens further satisfies the following condition:

$1.70 < n1$;

wherein n1 designates the refractive index the first lens.

* * * * *

UNITED STATES PATENT AND TRADEMARK OFFICE
CERTIFICATE OF CORRECTION

PATENT NO. : 6,002,533
DATED : December 14, 1999
INVENTOR(S) : S. Yoneyama

Page 1 of 1

It is certified that error appears in the above-identified patent and that said Letters Patent is hereby corrected as shown below:

<u>Title page,</u>
Item [22], Filing Date, "Jul. 28, 1998" should be -- Jul. 24, 1998 --.

Signed and Sealed this

Twenty-fifth Day of December, 2001

Attest:

Attesting Officer

JAMES E. ROGAN
Director of the United States Patent and Trademark Office